Figure 1:
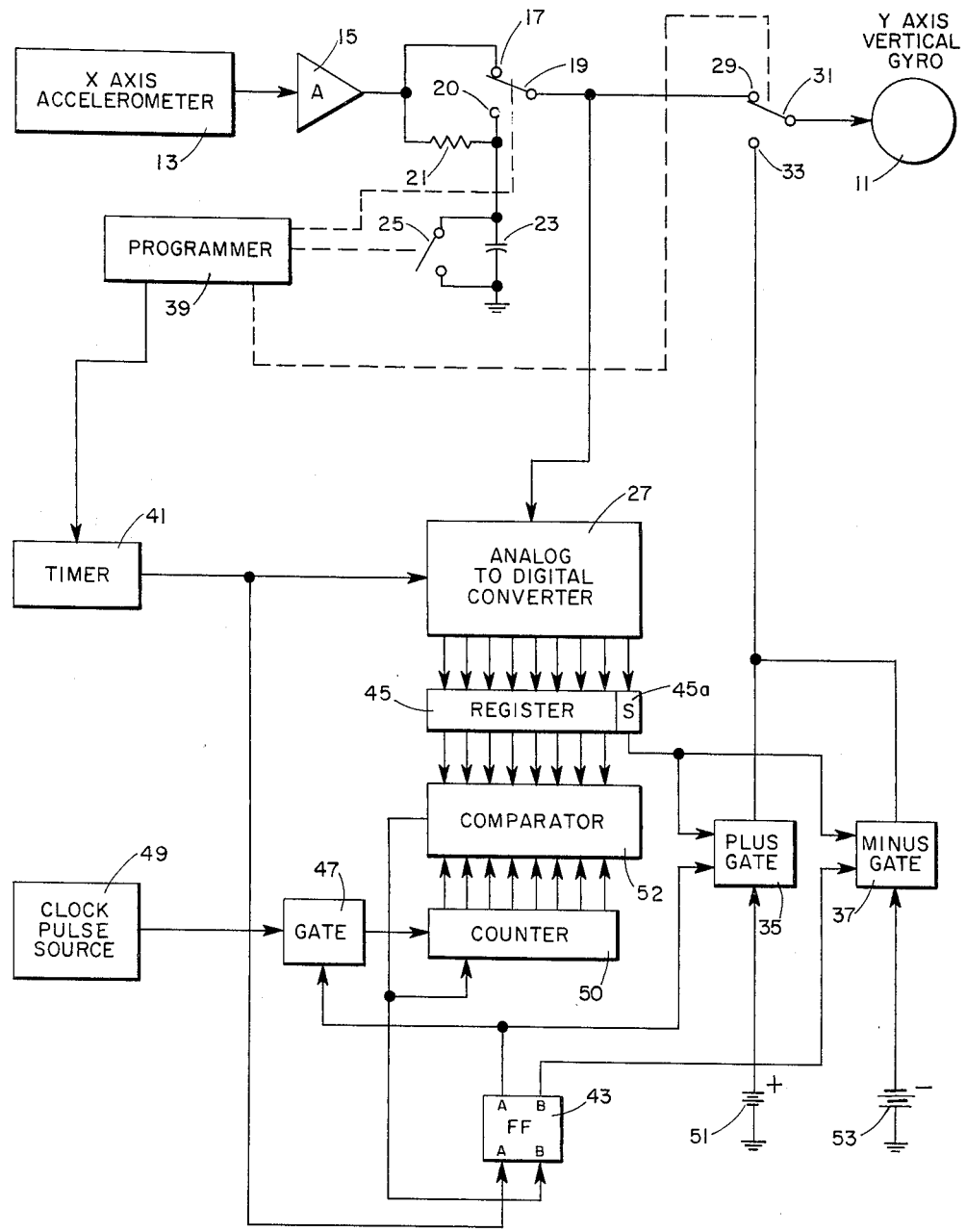

JAMES C. GEVAS
INVENTOR.

JAMES C. GEVAS
INVENTOR.

BY S. A. Giarratana
Francis L. Masselle
ATTORNEYS

United States Patent Office 3,237,313
Patented Mar. 1, 1966

3,237,313
DIGITAL PLATFORM ERECTION AND
GYROCOMPASSING
James C. Gevas, Roseland, N.J., assignor to General Precision Inc., Little Falls, N.J., a corporation of Delaware
Filed Jan. 4, 1963, Ser. No. 249,443
10 Claims. (Cl. 33—226)

This invention relates to platform erection and gyrocompassing in inertial systems, and more particularly to digital platform erection and gyrocompassing systems in which the time for completing precise erection and gyrocompassing is not directly dependent upon the time constants used in the systems to make them insensitive to incident dynamic noise.

In the platform erection systems and the gyrocompassing systems of the prior art, the servo mechanisms used in the systems drive servo errors to zero to achieve the desired erection of gyrocompassing. The time required by the systems of the prior art to achieve precise erection or gyrocompassing is large, and represents a vital loss of time in military operations where rapid response time is required. In the systems of the prior art, the erection and gyrocompassing time is large because the systems require relatively large time constants for the servo mechanisms in order to make the systems insensitive to incident dynamic noise. The existence of these relatively large time constants necessarily means that it will take a long time for the servo mechanisms to drive the servo errors to zero.

The present invention provides systems in which the time constants used to make the systems insensitive to incident dynamic noise do not directly affect the length of time it takes the systems to achieve precise erection and gyrocompassing. In the systems of the present invention, the errors in alignment are fed into RC networks or equivalents which provide the necessary time constants. The response of the RC networks is measured after a selected time delay, which is a small fraction of the time it would take the RC network to reach equilibrium, and from this response and from the precise knowledge of the time constants of the network and the time intervals after which the responses of the network are measured, the misalignment angles can be determined. Once the misalignment angles are known, the erection and gyrocompassing are carried out precisely in accordance with this determination by digital torquing. In this manner the platform erection and gyrocompassing is carried out in seconds, whereas in the systems of the prior art many minutes are required to perform these functions.

Accordingly, a principal object of the present invention is to provide improved platform erection and gyrocompassing systems.

Another object of the present invention is to reduce the time required for platform erection and gyrocompassing.

A further object of the present invention is to provide platform erection and gyrocompassing systems in which the time to carry out platform erection and gyrocompassing is not directly dependent upon the necessary time constants which are required to make the systems insensitive to incident dynamic noise.

A still further object of this invention is to provide an improved pulse torquing system.

Figure 2:
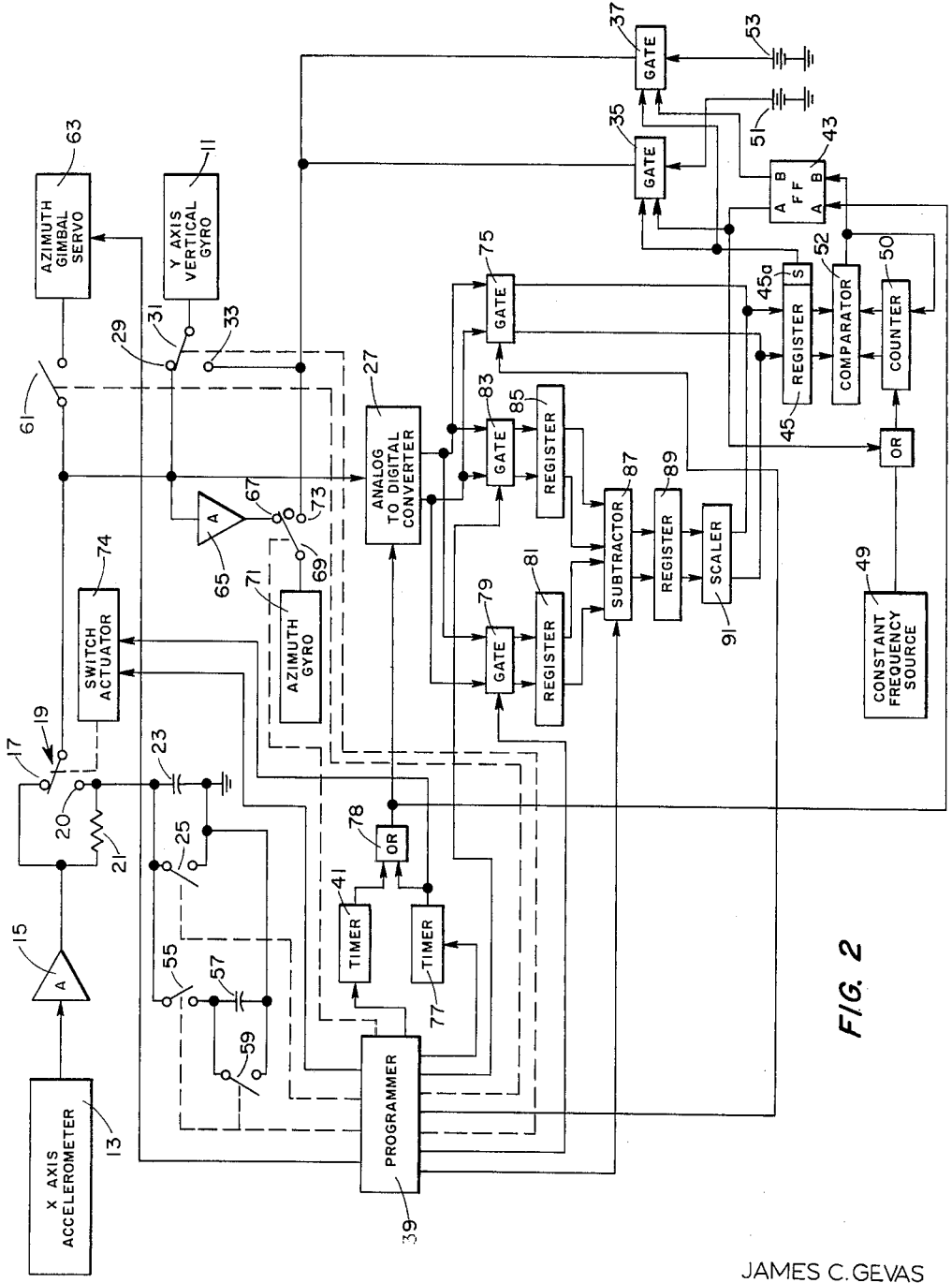

Further objects and advantages of the present invention will become readily apparent as the following detailed description of the invention unfolds and when taken in conjunction with the drawings, wherein:

FIG. 1 is a block diagram of a platform erection system in accordance with the present invention; and FIG. 2 is a block diagram of a gyrocompassing system in accordance with the present invention.

FIG. 1 shows an erection system for aligning a vertical gyro 11, which senses the deflection of the platform about the Y axis thereof. The system aligns the gyro 11 in response to the output signal of an accelerometer 13, which senses the acceleration along the X axis of the platform. An additional erection system is provided for aligning the vertical gyro, which senses deflection of the platform about the X axis thereof. The latter erection system operates in response to the platform accelerometer sensing acceleration along the Y axis. Of course, instead of two gyros a single two degree of freedom gyro can be used to sense deflection of the platform about both the X and Y axes, in which case the system shown in FIG. 1 would control the alignment of the two degree of freedom gyro about the Y axis and the system acting in response to the accelerometer sensing acceleration along the Y axis would control the alignment of the two degree of freedom gyro about the X axis of the platform. As shown in FIG. 1, the output signal of the accelerometer 13 is amplified by an amplifier 15 and applied to a contact 17 of a single-pole double-throw switch 19. The other contact of the switch 19 is designated by the refrence number 20. The output signal from the amplifier 15 is also applied to a time constant means which, in the illustrated embodiment, consists of a resistor 21 in series with a capacitor 23, one side of which is connected to the resistor and the other side grounded. As used herein "time constant means" is intended to denote a circuit element, combination, or network which responds to an applied signal in the manner of an RC network, i.e., along a pre-determined exponential curve. The junction between the resistor 21 and the capacitor 23 is connected to the contact 20 of the switch 19. A switch 25 is provided to selectively short out the capacitor 23. The pole of the switch 19 is connected to the input of an analog to digital converter 27 and to a contact 29 of a single pole double throw switch 31, the other contact of which is designated by the reference number 33. The pole of the switch 31 is connected to the torquer of the Y axis vertical gyro 11. The contact 33 is connected to the outputs of a pair of gates 35 and 37 which are part of logic circuitry to be described below. The switches 19, 25 and 31 are controlled by a programmer 39. The programmer 39 will operate the switches of the erection system controlling the torquing of the vertical gyro sensing deflection about the Y axis at the same time that it controls the torquing of the gyro 11 and the erection is carried out about the X and Y axes simultaneously. The discussion in the present application will be confined to the control of the torquing of the Y axis gyro 11 since the system for the X axis gyro is identical to and operates simultaneously with the system shown in FIG. 1. At the start of the erection operation, the programmer 39 closes the switch 25, shorting out the capacitor 23, and positions the pole of the switch 19 to engage the contact 17 and the pole of the switch 31 to engage the contact 29. The platform is then coarse erected by one of the rapid means such as case erection. Following the coarse erection of the platform, it will be within several arc minutes of true vertical. The programmer 39 then moves the pole of the switch 19 to engage the contact 20 and moves the pole of the switch 31 to engage the contact 33. The platform will then be in an untorqued free vertical mode. For the short period of time that the platform is in this mode, the vertical gyros are excellent stable references. The programmer 39 next opens the switch 25 and simultaneously starts a timer 41. A precisely predetermined time interval after the opening of the switch 25, the timer 41 enables the analog to digital converter 27 and simultaneously sets a flipflop 43 in its A state. The analog to digital converter 27, upon being enabled, reads out the signal voltage across the capacitor 23 and converts it to a binary number, which is stored in a register 45. When the switch 25 opens, the output voltage of the amplifier 15 begins charging the capacitor 23 through the resistor 21 and the voltage across the capacitor 23 increases along an exponential curve. The voltage that is read out by the converter 27 will thus depend upon the output signal voltage of the amplifier 15, the time constant of the exponential curve provided by the resistance of the resistor 21 and the capacitance of the capacitor 23, and the time interval set by the timer 41 for the converter 27 to read out the voltage across the capacitor 23 after the opening of the switch 25. The time constant provided by the resistor 21 and the capacitor 23 is selected to be long enough to render the voltage across the capacitor 23 insensitive to incident dynamic noise in the output signal of the accelerometer 13. Since the time constant of the RC circuit comprising the resistor 21 and the capacitor 23 is precisely known and the time interval set by the timer 41 is precisely known, the output voltage of the amplifier 15 with the incident dynamic noise removed can be computed from the voltage read out from the capacitor 23 by the converter 27. Specifically, the voltage read out by the converter 27 will be a predetermined fraction, fixed by the time constant of the RC circuit and the time interval set by the timer 41, of the output signal voltage of the amplifier 15 with the incident dynamic noise removed and therefore will be proportional to the output signal voltage of the amplifier 15. Thus the binary number stored in the register 45 will be proportional to the output signal of the accelerometer 13 and therefore will be proportional to the sine of the angle of misalignment of the gyro 11 from vertical. Since the angle of misalignment is small, the binary number will be substantially proportional to the misalignment angle. The sign of the binary number in the register 45 is stored in a unit 45a of the register 45. The signal representing the sign of the number in the register 45 is positive if the sign is positive, and is negative if the sign is negative. Thus the signal stored in the unit 45a will be positive if the voltage across the capacitor 23 is positive when it is read out by the converter 27 and will be negative if the voltage across the capacitor 23 is negative when it is read out by the converter 27. When the flipflop 43 is switched to its A state by the output signal from the timer 41, it enables a gate 47, which then permits pulses at constant repetitive rate from a clock pulse source 49 to be applied to the input of a counter 50. When the gate 47 is enabled, the counter 50 will have a count of zero registered therein and will begin counting the pulses passing through the gate 47. Binary signals representing the count registered in the counter 50 are continuously applied to a comparator 52, which also receives binary signals representing the absolute value of the binary number stored in the register 45. The signal representing the sign of the number stored in the register 45 is not applied to the comparator 52. The comparator 52 compares the binary numbers applied thereto from the counter 50 and from the register 45, and when the count registered by the counter 50 reaches the number stored in the register 45, the comparator 52 will produce an output signal which sets the count registered in the counter 50 back to zero and resets the flipflop 43 back to its B state. When the flipflop 43 is in its A state, it applies a positive signal to the gate 35 and applies a negative signal to the gate 37. When the flipflop 43 is in its B state, it applies a positive signal to the gate 37 and a negative signal to the gate 35. The signal representing the sign of the number stored in the register 45 is applied from the unit 45a to the gates 35 and 37. If the sign of the number stored in the register 45 is positive, this signal from the unit 45a will be positive, and if the number stored in the register 45 is negative, this signal will be negative. When the gate 35 receives positive signals applied to it from both the flipflop 43 and from the unit 45a, it will pass a constant positive voltage therethrough from a D.C. voltage source 51. The gate 37 will be enabled when it receives negative signals applied thereto from both the flipflop 43 and from the unit 45a and will pass therethrough a constant negative voltage from a D.C. voltage source 53. Thus if the sign of the number stored in the register 45 is positive, then the gate 35 will be enabled for the length of time that the flipflop 43 is in its A state whereas the gate 37 will not be enabled since it will receive a positive signal from the unit 45a of the register 45. However, when the sign of the number stored in the register 45 is negative, then the gate 37 will be enabled while the flipflop 43 is in its A state, whereas the gate 35 will not be enabled. When the flipflop 43 is in its B state, neither of the gates 35 or 37 will be enabled since the gate 35 will receive a negative signal from the flipflop 43 and the gate 37 will receive a positive signal from the flipflop 43. The flipflop 43 is switched to its A state when the timer 41 enables the converter 27 and switched back to its B state when the comparator 52 produces an output signal indicating that the count registered by the counter 50 has reached a number equal to the number registered by the register 45. Since the pulses from the clock pulse source 49 are produced at a constant repetitive rate, the flipflop 43 will be in its A state for a time interval proportional to the binary number in the register 45. Thus one of the gates 35 or 37, depending upon the sign of the number stored in the register 45, will produce a rectangular output pulse having a length proportional to the binary number stored in the register 45. If the number stored in the register 45 is positive, the gate 35 will apply a positive rectangular pulse through the switch 31 to the torquer of the gyro 11 and if the binary number stored in the register 45 is negative, the gate 37 will apply a negative pulse through the switch 31 to the torquer of the gyro 11. Thus a square wave pulse having a length proportional to the output signal of the accelerometer 13 and a polarity corresponding to the polarity of the output signal of the accelerometer 13 will be applied to the torquer of the gyro 11. The square wave pulse from the gate 35 or the gate 37 is applied to the torquer of the gyro 11 with a polarity to precess the gyro 11 about its Y axis in a direction to reduce the output signal of the accelerometer 13. The amplitudes of the D.C. sources 51 and 53 are selected, and thus the amplitude of the square wave pulse produced by one of the gates 35 and 37 is selected, so that the gyro 11 is torqued by the applied pulse precisely to vertical alignment about the Y axis where the accelerometer 13 produces no output signal. The amplitude of the torquing pulse can be selected to perform this operation because the length of the pulse will be proportional to the output signal of the accelerometer 13 and hence proportional to the sine of the angle of misalignment from vertical of the platform about the Y axis. The identical system torquing the X axis gyro also torques the X axis gyro precisely to vertical alignment about the X axis where the accelerometer sensing acceleration along the Y axis produces no output signal. In this manner the platform is precisely erected. The erection operation takes place in just a few seconds compared with the many minutes required by the systems of the prior art, and yet the system is just as insensitive to incident dynamic noise as are the systems of the prior art, which require many minutes to achieve precise erection. In the system of the present invention as well as the systems of the prior art, a relatively long time constant is used to make the system insensitive to incident dynamic noise. However the system of the present invention achieves precise erection without being slowed down by the time constant, whereas in the systems of the prior art the erection time is inherently keyed to the time constant. Where necessary for increased accuracy the system digital computer will increase the torquing signals to gyro 11 by the ratio of the angle of misalignment to the sine of the angle of misalignment.

In FIG. 2 the system of the present invention is expanded to provide gyrocompassing to precisely align the platform with north in addition to precisely erecting the platform. As in the system of FIG. 1 the circuitry for erecting the platform about the X axis is not shown since this circuitry will again be identical to that shown for the Y axis in FIG. 1. In the system of FIG. 2 the gyrocompassing as well as the erection of the platform about the Y axis is carried out in response to the output signal of the accelerometer 13, which measures acceleration along the X axis of the platform. The output signal of the accelerometer after being amplified by the amplifier 15 is applied to the contact 17 of the switch 19 and through the resistor 21 to one side of the capacitor 23 as in the system of FIG. 1. The other side of the capacitor 23 is connected to ground and the junction between the capacitor 23 and the resistor 21 is connected to the contact 20 of the switch 19. The switch 25 again is connected across the capacitor 23 to selectively short it out. The pole of switch 19 is connected to the input of the analog to digital converter 27 and to the contact 29 of the switch 31. The pole of the switch 31 is connected to the torquer of the gyro 11 and the contact 33 of the switch 31 is connected to the outputs of the gates 35 and 37. Thus all of this circuitry is the same as that used in the system of FIG. 1. In addition to this circuitry the system of FIG. 2 has a switch 55 which selectively connects the junction between the capacitor 23 and the resistor 21 to one side of a capacitor 57, the other side of which is connected to ground. A switch 59 is provided to selectively short out the capacitor 57. A switch 61 is provided to selectively connect the pole of the switch 19 to the input of the azimuth gimbal servo for the platform of the system. The azimuth gimbal servo is designated by the reference number 63 in FIG. 2. The pole of switch 19 is also connected to the input of an amplifier 65, the output of which is connected to a contact 67 of a single pole double throw switch 69. The pole of the switch 69 is connected to the torquer of the azimuth gyro, which is designated by the reference number 71. The other contact 73 of the switch 69 is connected to the outputs of the gates 35 and 37. The switch 19 instead of being controlled directly from the programmer 39 is controlled by a switch actuator 74, which when it is not energized will position the pole of the switch 19 in engagement with the contact 17 and when it is energized it will position the pole of the switch in engagement with the contact 20. The switch actuator 74 can be energized either by the programmer 39 or by a timer 77.

In the operation of the system to erect the platform and gyrocompass it to true north, the platform is first coarse erected by a means such as case erection. Following the coarse erection, the system is put in a very high gain first order erection mode for a very short period. In this mode the switch actuator 74 will not be energized, so that the pole of the switch 19 will engage the contact 17. The programmer 39 will position the pole of the switch 31 to engage the contact 29, and the pole of the switch 69 to engage the contact 73. The programmer also will open the switches 61 and 55 and close the switches 25 and 59 in this mode. Thus the output signal of the accelerometer after being amplified by the amplifier 15 will be fed directly to the torquer of the gyro 11. At the same time by a system like that shown in FIG. 1 the output signal from the accelerometer sensing acceleration along the Y axis of the platform will be amplified and fed to the torquer of the vertical gyro sensing deflection about the X axis of the platform. During this mode the platform will be brought closer to alignment with vertical. After a very short period of time the switch 61 is closed and the pole of the switch 69 is moved to engage the contact 67. Thus the output signal from the accelerometer 13 after being amplified by the amplifier 15 is fed to the input of the azimuth gimbal servo 63 and after being amplified by the amplifier 65 is fed to the torquer of the azimuth gyro 71. The platform will therefore be rapidly driven in azimuth until the amplified output signal from the amplifier 15 is driven to 0. When the output signal of the amplifier 15 has been driven to 0 in this manner, the platform will be crudely vertical and crudely aligned with north with errors in the orders of tens of arc minutes at most. When the output signal from the amplifier 15 has been driven to 0, the programmer 39 opens the switch 61 and moves the pole of the switch 69 out of engagement with the contact 67 but keeping it also out of engagement with the contact 73, thus effectively freezing the platform in azimuth. The system then proceeds to precisely erect the platform. This is accomplished with the circuitry shown in FIG. 2, enabling the timer 41 through an OR gate 78, in the same manner as it is accomplished in the system in FIG. 1 except that during this precise erection phase the programmer 39 controls the positioning of the switch 19 by means of the switch actuator 74 and enables a gate 75 which permits the output signals from the analog to digital converter 27 representing the binary number corresponding to the voltage read out by the converter 27 to pass through into the register 45. To this end, following the above coarse erection of the platform, the switch actuator 74 will be energized by the programmer 39 so that the pole of the switch 19 will be in engagement with the contact 20. In addition the pole of the switch 31 will be in engagement with the contact 33, the pole of the switch 69 will be disengaged from both of the contacts 73 and 67, and the switch 61 will be open. The switches 25 and 55 will be open and the switch 59 will be closed. In the end, the platform will be precisely aligned with vertical; that is there will be no hangoff in the vertical either due to gyro drift or due to the vertical component of the earth's rate sensed by the gyro 11 due to the angular deviation of the platform from true north. The system then enters into the gyrocompassing phase of the operation. At the start of this phase the programmer closes the switch 25 momentarily to discharge the capacitor 23 and then moves the pole of the switch 31 to engage the contact 29, closes the switch 55, and opens the switch 59. At the same time the programmer 39 actuates the timer 77 and de-energizes the actuator 74 so that the pole of the switch 19 is moved to engage the contact 17. The gyro 11 will then begin to precess toward the hangoff angle at which the platform will be in equlibrium. During this time the capacitors 23 and 57 are being charged by the output signal of the amplifier 15 through the resistor 21. At a predetermined fraction of the time constant of the RC circuit comprising the resistor 21 and the capacitors 23 and 57 after the timer 77 is actuated, the timer 77 enables the converter 27 through an OR gate 78 and momentarily energizes the switch actuator 74, which moves the pole of the switch 19 to engage the contact 20. The converter 27 then reads out the voltage across capacitors 23 and 57. The voltage across the capacitors 23 and 57 at this time will be a predetermined fraction of the output signal voltage of the amplifier 15 which would represent the hangoff in vertical of the gyro 11 at equilibrium. The analog to digital converter 27 converts the analog voltage read out from the capacitors 23 and 57 to a binary number, which is applied to a gate 79. The gate 79 will be enabled by the programmer 39 at this time so that the binary number will pass through the gate 79 and be stored in a register 81. Thus the number stored in the register 81 will be proportional to the output signal of the accelerometer 13, which would have been produced if the gyro 11 had precessed to its hangoff angle at equilibrium. The output signal of the accelerometer 13 at equilibrium can be represented by the following expression: $D + \omega \cos \Lambda \sin \delta$ in which D is gyro drift rate, $\omega$ is the earth's rate of rotation, $\Lambda$ is the latitude, and $\delta$ is the angle of misalignment of the platform from true north. Following the storing of the binary number in the register 81 proportional to the output signal of the accelerometer 13, the programmer next applies a signal to the gimbal servo 63 to cause it to reverse the platform about its Z axis, rotating the platform through approximately 180°, and closes the switches 25 and 59 discharging the capacitors 23 and 57. The system then operates to precisely erect the platform again in the same manner as described above. After the platform has been erected the system again measures the output signal of the amplifier 15 which would be produced if the platform were allowed to precess to the hangoff angle in the same manner as before, only this time the programmer 39 enables a gate 83 instead of the gate 79 and the binary number produced by the converter 27 passes through the gate 83 and is stored in a register 85. The binary number stored in the register 85 in this manner will be proportional to the output signal of the accelerometer 13 which would have been produced if the gyro 11 had precessed to its hangoff angle at equilibrium with the platform rotated 180°. This output signal can be represented by the following expression: $D + \omega \cos \Lambda \sin (\delta + \psi')$ in which $\psi'$ is the actual angle the platform rotated through as measured by the azimuth angle sensor. After the binary numbers have been stored in the registers 81 and 85, the programmer 39 enables a subtractor 87 which subtracts the number stored in the register 85 from the number stored in the register 81 and stores the difference in a register 89. Thus the number stored in the register 89 will be proportional to:

$$-D + \omega \cos \Lambda \sin \delta + [D + \omega \cos \Lambda \sin (\delta + \psi')]$$
$$= \omega \cos \Lambda [\sin (\delta + \psi') - \sin \delta]$$

The number stored in the register 89 is applied to a scaler 91 which converts the binary number applied thereto to a binary number representing $\delta$, which is then stored in the register 45. The system will then produce from the gate 35 or the gate 37 a constant amplitude square wave pulse having a length proportional to the number stored in the register 45. If the number stored in the register 45 is positive, a positive pulse will be produced from the gate 35 and if the number stored in the register 45 is negative the pulse will be from the gate 37 and it will be negative. When this output pulse is produced from the gates 35 and 37, the programmer 39 will move the pole of the switch 69 to engage the contact 73 so that the pulse will be applied to the torquer of the azimuth gyro 71. The amplitude of the square wave pulse is such that it will torque the azimuth gyro 71 the precise amount to align it with north. Finally when necessary, the system again erects the platform in the manner described above so that the platform is precisely aligned with north and with vertical. In this manner the system of the invention rapidly erects the platform and gyrocompasses it to true north with high precision. The erection and gyrocompassing operation is carried out in a very short period of time and yet the dynamic incident noise in the output of the accelerometer is rendered negligible by the time constants provided by the resistor 21 and the capacitors 23 and 57. As pointed out above conventional erection and gyrocompassing systems take a long period of time to perform their functions because they require large time constants in their servo systems to render negligible the noise in the output of the accelerometer. The system of the present invention as described above takes advantage of the long time constants of the systems of the prior art but nevertheless carries out the erection and the gyrocompassing in a very short period of time.

In many applications, the platform need not be torqued to north but the north misalignment need only be calculated by the system digital computer (if the scaler 91 is not accurate enough to approximate $$\omega \cos \Lambda [\sin (\delta + \psi') - \sin \delta]$$

Many modifications may be made to the above-described specific embodiment of the invention without departing from the spirit and scope of the invention, which is defined in the appended claims.

What is claimed is:

1. A digital torquing system comprising time constant means to respond to an applied input signal along a predetermined exponential curve, readout means, including a time, detecting the response of said time constant means after a time interval which is a predetermined fraction of the time it takes said time constant means to reach equilibrium, and means to generate a digital torquing signal having an impulse content determined in accordance with the response of said time constant means detected by said readout means.

2. In an inertial system having a platform, an accelerometer mounted on said platform to detect acceleration along one horizontal axis of said platform, and a vertical gyro mounted on said platform to detect deflection of said platform about the other horizontal axis of said platform, the improvement comprising time constant means to respond to the output signal of said accelerometer along a predetermined exponential curve, readout means, including a timer, detecting the response of said time constant means after a time interval which is a predetermined fraction of the time constant of said exponential curve, and means to torque said vertical gyro with a digital signal having an impulse content determined in accordance with the response of said time constant means detected by said readout means.

3. In an inertial system having a platform, an accelerometer sensing acceleration along a horizontal axis of said platform, a vertical gyro, and an azimuth gyro, an improved gyrocompassing system comprising time constant means to respond to the output signal of said accelerometer along a predetermined exponential curve, readout means operable when enabled to detect the response of said time constant means, and means first to enable said readout means after a time interval which is a predetermined fraction of the time constant of the exponential curve of said time constant means to produce a first output from said readout means, then to erect said platform in response to said first output of said readout means, then to return said time constant means to its initial state and apply the output signal of said accelerometer to the torquer of said vertical gyro, and then to again enable said readout means after a time interval which is a predetermined fraction of the time constant of the exponential curve of said time constant means to produce a second output from said readout means, and then to digitally torque said azimuth gyro an amount determined in accordance with the second output of said readout means.

4. A digital torquing system comprising time constant means to respond to an applied input signal along a predetermined exponential curve, readout means, including a timer, detecting the response of said time constant means after a time interval which is a predetermined fraction of the time constant of said exponential curve, and means to generate a digital torquing signal having an impulse content linearly variable in accordance with the response of said time constant means detected by said readout means.

5. A digital torquing system comprising time constant means to respond to an applied input signal along a predetermined exponential curve, readout means, including a timer, detecting the response of said time constant means after a time interval which is a predetermined fraction of the time constant of said exponential curve, and means to generate a signal proportional to the response detected by said readout means.

6. A digital torquing system comprising an input, a capacitor, a resistor, circuit means connecting said input through said resistor to said capacitor so that a signal applied to said input will charge said capacitor through said resistor, readout means, including a timer, detecting the voltage across said capacitor after a time interval which is a predetermined fraction of time constant of the RC circuit comprising said resistor and said capacitor, and means to generate a digital torquing signal determined in accordance with the voltage detected by said readout means.

7. In an inertial system having a platform, a vertical gyro, an azimuth gyro, and an accelerometer sensing acceleration along a horizontal axis, an improved gyrocompassing system comprising circuit means to torque said vertical gyro with a signal proportional to the output signal of said accelerometer, time constant means to respond when actuated to the output signal of said accelerometer along an exponential curve, readout means to detect the response of said time constant means when enabled, program means to actuate said time constant means and then to enable said readout means after a time interval which is a fraction of the time constant of said exponential curve, and means to torque said azimuth gyro an amount determined in accordance with the response detected by said readout means.

8. In an inertial system having a platform, a vertical gyro, an azimuth gyro, and an accelerometer sensing acceleration along a horizontal axis of said platform, an improved gyrocompassing system comprising
    time constant means operable when enabled to respond to the output of said accelerometer selectively along a first exponential curve or along a second exponential curve,
    detecting means operable when enabled to read out the response of said time constant means, and
    program means to first enable said time constant means to respond along said first exponential curve, to then enable said detecting means after a time interval which is a predetermined fraction of the time constant of said first exponential curve to produce a first output, to then erect said platform in response to said first output of said detecting means, to then enable said time constant means to respond along a second exponential curve and to torque said vertical gyro with a signal proportional to the output signal of said accelerometer, to then enable said detecting means after a time interval which is a predetermined fraction of the time constant of said second expanential curve to produce a second output, to then rotate said platform through 180° about the vertical axis of said platform to then enable said time constant means to respond along said first exponential curve, to then enable said detecting means to read out the response of said time constant means after a time interval which is a predetermined fraction of the time constant of said first exponential curve to produce a third output, to then erect said platform in response to the third output of said detecting means, to then enable said time constant means to respond along said second exponential curve and to torque said vertical gyro with a signal proportional to the output signal of said accelerometer, to then enable said detecting means to read out the response of said time constant means after a time interval which is a predetermined fraction of the time constant of said second exponential curve to produce a fourth output, to then subtract said fourth output from said second output to produce a signal representing the difference therebetween, and then to torque said azimuth gyro an amount proportional to said difference.

9. A method of gyrocompassing a platform, having an azimuth gyro, a vertical gyro, and an accelerometer sensing acceleration of the platform along a horizontal axis thereof, by means of a time constant means which when enabled responds to an applied input signal along an exponential curve comprising the steps of: first precisely erecting said platform, then torquing said vertical gyro with a signal proportional to the output signal of said accelerometer while at the same time enabling said time constant means and applying the output signal of said accelerometer to the input of said time constant means, then detecting the response of said time constant means after a time interval which is a predetermined fraction of the time constant of said exponential curve, and then torquing said azimuth gyro an amount determined by the detected response of said time constant means.

10. A method of gyrocompassing a platform, having an azimuth gyro, a vertical gyro, and an accelerometer sensing acceleration along a horizontal axis of said platform, by means of a time constant means which when enabled responds to an applied input signal along an exponential curve comprising the steps of: first precisely erecting said platform, then torquing said vertical gyro with a signal proportional to the output signal of said accelerometer while at the same time enabling said time constant means and applying the output signal of said accelerometer to the input of said time constant means, then detecting the response of said time constant means after a time interval which is a predetermined fraction of the time constant of said exponential curve to produce a first output, then rotating said platform through 180° about its vertical axis, then precisely erecting said platform, then torquing said vertical gyro with a signal proportional to the output signal of said accelerometer while at the same time enabling said time constant means and applying the output signal of said accelerometer to the input of said time constant means, then detecting the response of said time constant means after said predetermined time interval to produce a second output, and then torquing said azimuth gyro an amount proportional to the difference between said first output and said second output.

References Cited by the Examiner

UNITED STATES PATENTS

| | | | |
|---|---|---|---|
| 2,887,783 | 5/1959 | Blizard | 33—226 |
| 2,937,532 | 5/1960 | Emmerich | 74—5.4 |
| 3,082,628 | 3/1963 | Moller | 74—5.4 |
| 3,176,119 | 3/1965 | Deschamps | 33—226 X |

ROBERT B. HULL, *Primary Examiner.*